Feb. 23, 1954
R. FISHWICK
2,670,214
CHUCK
Filed Jan. 24, 1951
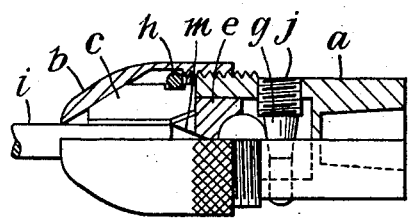
FIG. 1.
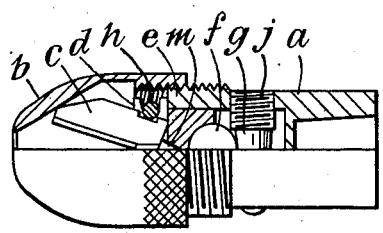
FIG. 2.
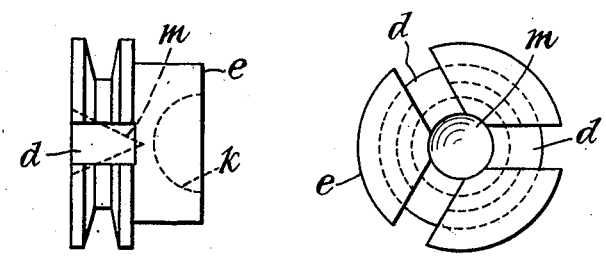
FIG. 3.
FIG. 4.
INVENTOR
ROBERT FISHWICK.
BY Wisner & Sloman
ATTORNEY Patented Feb. 23, 1954

2,670,214

UNITED STATES PATENT OFFICE 2,670,214

CHUCK

Robert Fishwick, London, England, assignor to C. V. A. Jigs Moulds & Tools Limited, Hove, Sussex, England, a British company Application January 24, 1951, Serial No. 207,472

2 Claims. (Cl. 279—36)

This invention relates to bevel-closing chucks in which the tool is first gripped by an initial gripping device and then further gripped by a locking auxiliary device.

The object of the invention is to provide an improved form of such type of chuck, easy to manufacture and simple and convenient in operation.

The invention consists in a bevel-closing chuck in which chuck jaws are forced into contact with a tool by means of a screwed cap having an internal wedge surface which can be forced against corresponding wedge surfaces on the outside of the chuck jaws, and a pin or shaft tapered concentrically with its axis and adjustably mounted transverse to the axis of the chuck and a steel or like ball disposed to the axis of the chuck between the transverse pin and the chuck jaws so that by adjustment of the pin in the direction of its axis the tapered surface thereof can cause pressure to be exerted on the chuck jaws through the medium of the ball; as also shown in copending application Serial #207,473, filed January 24, 1951, being a division of the present application.

Figure 1 is a part elevational longitudinal sectional view of one example of chuck incorporating the present invention with a tool shown in secured position.

Figure 2 being a similar view with the tool removed and

Figures 3 and 4 are enlarged side and end elevational views respectively of a detail.

In carrying the invention into effect in the form illustrated by way of example, the principal components of the chuck are a body, tapered shaft, cap, ball, piston, spring and jaws. The body $a$ is a cylindrical body, the end of which is screw-threaded for the reception externally of the cap $b$, which is threaded internally. The cap is also coned internally and with this internal cone, coned surfaces on the exterior of the jaws $c$ engage. The jaws are guided in radial slots $d$ in a plunger member $e$ having a tapered hole $m$ and being slidable axially in relation to the body $a$ by means of a ball $f$ and the tapered shaft $g$. The jaws are normally maintained in the position shown in Figure 2 by a rubber band or resilient ring of wire $h$ in readiness to receive, say, the shank of a drill $i$.

The body is drilled transversely for the reception of the tapered shaft $g$, the taper being concentric with the axis of the shaft. The shaft has a parallel portion at the forward end which fits a hole in the wall of the chuck and acts as a support. The end of the shaft is screwthreaded at $j$ into the body, so that the taper may be moved to and fro across the axis of the body. Between the tapered shaft $g$ and the jaws $c$ the body contains the aforesaid ball $f$ and plunger $e$. The ball is in contact with the shaft and the plunger carries the jaws. A tool such as the drill $i$ is gripped between the jaws in the first instance by rotation of the screwed cap $b$. It is then further gripped and locked by rotation of the tapered shaft $g$ operating on the jaws through the ball and the plunger. The ball sits in a recess $k$ in the plunger and is rotated in either of two directions by movement of the tapered shaft, mainly in the direction of the body axis as the tapered shaft has a component of action in that direction and in the direction of the axis of the tapered shaft. The external shape of the cap may be any suitable desired form, but we prefer it to be somewhat of the nature of a round nosed bullet.

What I claim is:

1. In a bevel closing chuck having a body, chuck jaws adapted to be urged to closed position by means of a cap and having external tapered surfaces, a cap supported upon one end of said body adjustable longitudinally thereof and having an internal tapered surface adapted to cooperatively engage the tapered surfaces of said jaws, a plunger in said body supporting said jaws for movement longitudinally of said body, a tapered spindle extending across said body for movement transversely thereof and spaced rearwardly from said plunger, there being a recess in said plunger, a ball rotatably seated in said recess in engagement with the tapered surface of the spindle and adapted to transmit to said plunger the longitudinal component of the thrust exerted on the ball by said tapered surface upon movement of the spindle in one direction transversely of the body, whereby when the jaws are held in gripping engagement with an object by said cap, transverse movement of the spindle in said one direction urges the jaws more firmly into engagement with the cap to more securely grip said object.

2. A bevel closing chuck as claimed in claim 1, said spindle being supported in screw threaded engagement with the body whereby rotation of the spindle causes the tapered surface to move transversely of the body.

ROBERT FISHWICK.

References Cited in the file of this patent

UNITED STATES PATENTS

| Number | Name | Date |
|---|---|---|
| 1,132,550 | Bodmer | Mar. 23, 1915 |
| 2,040,678 | Van Buskirk | May 12, 1936 |

FOREIGN PATENTS

| Number | Country | Date |
|---|---|---|
| 496,296 | France | Oct. 31, 1919 |
| 346,487 | Germany | Dec. 31, 1921 |